United States Patent [19]

Miyata

[11] 4,264,155
[45] Apr. 28, 1981

[54] COLLAGEN CONTACT LENS

[75] Inventor: Teruo Miyata, Tokyo, Japan

[73] Assignee: Opticol Corporation, Stamford, Conn.

[21] Appl. No.: 55,872

[22] Filed: Jul. 9, 1979

[51] Int. Cl.³ .................. C07G 7/00; C08L 89/06; G02C 7/04
[52] U.S. Cl. .................. 351/160 H; 260/8; 260/123.7; 435/273
[58] Field of Search .................. 351/160 R, 160 H; 260/117, 123.7, 8; 435/273

[56] References Cited

U.S. PATENT DOCUMENTS

| | | | |
|---|---|---|---|
| 3,314,861 | 4/1967 | Fujii | 260/117 |
| 3,443,261 | 5/1969 | Battista | 351/160 H |
| 3,530,037 | 9/1970 | Nishihara | 351/160 H |
| 3,760,045 | 9/1973 | Thiele et al. | 351/160 H |
| 3,955,012 | 5/1976 | Okamura et al. | 351/160 H |

FOREIGN PATENT DOCUMENTS 49-39174  10/1974  Japan .................. 351/160 H

*Primary Examiner*—John K. Corbin
*Assistant Examiner*—Scott J. Sugarman
*Attorney, Agent, or Firm*—Edward J. Mahler

[57] ABSTRACT

Improved soft contact lenses are made from collagen gels to which water-soluble organic polyhydroxy polymers are added, e.g. mucopolysaccharides, polyvinyl alcohols, etc.

8 Claims, No Drawings

COLLAGEN CONTACT LENS

This invention relates to an improved soft contact collagen gel lens. The lens consists of a lens body comprising collagen gel to which is added varying amounts, not more than fifty percent, of at least one water-soluble, organic polyhydroxy polymer, after which the gel is shaped and subsequently cross-linked.

Collagen constitutes about 20 to 30 percent of the total body protein in vertebrates. It is a fibrous protein and functions primarily as a supporting tissue and scaffolding for other proteins and cells. It is present throughout the body but exists in high concentrations in skin, tendon and bone.

Collagen is recovered from these tissues by a variety of techniques the oldest known method being the boiling of the tissue in water which denatures some of the collagen and forms the well-known gelatin on cooling. For use as a biomaterial however, collagen must be recovered in native, undenatured form, i.e., with little or no destruction of the basic rigid triple helical structure; (tropocollagen).

Undenatured native collagen is recovered principally by two methods, (a) a solution by dissolving the collagen in acids, bases, salts or by enzyme digestion in which instances the collagen becomes actually dissolved, and (b) extraction in solid, undissolved, fiber form usually by the action of aqueous salt on minced, comminuted collagen raw material to produce a dispersion from which the solid is recovered by centrifuge, etc. Both the solution method and fiber extraction method are well described in the collagen art.

The chemistry, molecular structure and biochemical properties of collagen have been well-established. An up-to-date review article by the current inventors (Annual Review of Biophysics and Bioengineering Vol. 3, p. 231–253, 1974) contains an excellent compilation of references on the subject.

Contact lenses have been known as a commercial product for over 25 years. Contact lenses to date have been made from chemically synthesized materials which do not occur in nature. For example, most early contact lenses were made from polymethylmethacrylate or chemical modifications thereof, from hydroxyethylmethacrylate, from cellulose acetate butyrate, from silicones, etc. The collagen lens is the first lens made from naturally occurring animal material and especially from materials having physiological and immunological properties possessed by constituents of the eye itself, e.g., the cornea. The state of the art on commercial contact lenses is reviewed in a current article "A Contact Lens Update"—Contact Lens Forum, p 16–23 (May 1976).

In copending application Ser. No. 26,945, filed Apr. 4, 1979, now U.S. Pat. No. 4,223,984 which is a continuation of Ser. No. 753,556 filed Dec. 22, 1976, now abandoned, there is described and claimed a collagen gel contact lens in which the collagen is made from reconstituted, solubilized, defatted collagen gels, particularly enzyme-solubilized gels.

In copending application Ser. No. 29,091, filed Apr. 11, 1979 there is described and claimed a soft contact collagen lens made from gels of fiber collagen, and from gels comprising a mixture of solubilized collagen and fiber collagen.

The invention of instant application is applicable to both types of collagen gels, viz. solubilized or fiber or mixtures thereof.

It has now been discovered that lenses of improved physical strength and of improved biological stability (i.e. resistance to bacterial attack) may be prepared from collagen gels to which has been added at least one water-soluble, organic polyhydroxy polymer, such as: mucopolysaccharides, polyvinyl alcohols, polyhydroxyalkyl methacrylates, carboxy methylcellulose, polyvinylpyrrolidone, carboxy vinyl polymers, etc. The polymer is added to the collagen gel in amounts ranging from 1.0% to 100% of the weight of collagen in the gel. Preferred additives are the mucopolysaccharides such as chondroitin sulfate, hyaluronic acid, etc. which are available commercially in relatively pure state. The preferred concentration of the additive varies with the particular additive, but generally falls within 5 to 50% of the weight of collagen in the gel.

It is well known that native collagen is relatively free from attack by most enzymes except under certain conditions. An exception is the enzyme collagenase which is capable of reducing collagen to polypeptides. It is important therefore to render the collagen gel as resistant as possible to decomposition. Crosslinking of the gel goes a long way toward the physical strengthening of the molecular structure and at the same time stabilizes the lens against proteolytic enzyme attack. Additional stability is provided by protecting the collagen molecule with the addition thereto of the water-soluble, organic polyhydroxy polymers of this invention.

Bacteria produce a variety of enzymes that could digest collagenous materials. The most active of these is Pseudomonas Aeruginosa. It has been known that a human cornea infected with this bacteria can be destroyed in a matter of hours, absent prompt discovery and expert treatment. The effects of incubating collagen lenses in a dense suspension of Pseudomonas Aeruginosa strain is used, therefore, to estimate the stability of the lens to proteolytic attack. In these tests concentrations of bacteria are used far in excess of that which the lens could possibly encounter in normal human experience. Practically all collagen lens, properly prepared and cross-linked, even when exposed to the dense concentrations of the strain have exhibited far greater resistance than that reported for human cornea resistance.

Applicant does not know the mechanism by which the additivies of this invention produce their results, but it is believed that the additives surround the strands of the collagen molecules and protect them from attack by micro-organisms. Applicant has found that the conditions of crosslinking are highly important in producing collagen gel lenses having optimum biological properties. It has been found that under too severe conditions during the crosslinking process, e.g. excessive amounts of irradiation or too lengthly irradiation, certain "breaks" in the collagen triple helix structure occur and these possibly become nucleating sites for the growth of enzyme-producing bacteria which subsequently attack the collagen molecule and result in the liquefaction of the gel. It is possible that applicant's additives prevent the occurrence of such breaks, or, if they do occur, prevent them from becoming sites susceptible to the action of proteolytic enzymes of bacterial origin.

Gels suitable for use in the preparation of collagen lenses of this invention may be prepared from solubilized collagen, from fiber collagen and from mixtures thereof. The preferred gel is one made from enzyme-solubilized collagen which has been treated for removal of fats and lipid bodies and which is poor in telopeptides and relatively free of other contaminating proteins, saccharides, etc. When mixtures of solubilized collagen and fiber collagen are used to prepare the gel, the ratio of solubilized collagen to fiber collagen is not critical and may range from 10 to 1 to 1 to 10; however, mixtures in the range of 50—50 are preferred.

RECOVER OF COLLAGENS FROM CRUDE SOURCE

The method of obtaining solubilized or fibril collagens from the crude collagen source, e.g. skin, tendon, hide, etc., is not critical, and some flexibility may be used in the selection of the particular tissue and the method applied thereto; for example, applicants prefer enzyme extraction when preparing solubilized collagen regardless of the nature of the tissue.

(A) SOLUBILIZED COLLAGEN

The greater part of native collagen is insoluble, but can be solubilized in dilute acids, e.g. acetic acid; in bases e.g. NaOH; and dilute aqueous salts, e.g. NaCl. In all relatively low yields are obtained. All processes are well known in the collagen extraction art. Since applicants prefer enzyme extraction as the better method of obtaining solubilized collagen for their mixed collagen gel lenses, this extraction process will be described in more detail than the others.

(i) Acid extraction

Collagen tissue of young animal such as calfskin contains about 1–2% acid soluble collagen. This collagen is extracted by pH 2–4 aqueous acid solution such as 0.1 acetic acid or 0.15 M citrate buffer pH 3.6. But this is not economical because yield is so small.

(ii) Base extraction

Corium layer of hide is soaked in 4% NaOH containing 0.2 M monomethylamine and 15% sodium sulfate for 10–15 days at room temperature. The hide is washed with water to remove bases and then extracted by stirring in 0.1 N acetic acid—0.1 M NaCl, pH 2.8.

Almost all the hide is dissolved and a viscous solution is obtained. This collagen is precipitated by raising the pH to 4–5, collected by centrifugation and washed with water. After dehydration with ethanol, the collagen is treated with ethanol-ether (1:1) to remove fat. After air-drying, collagen is dissolved in an acidic aqueous solution, pH 2–4 and filtered through millipore filters up to 0.65μ pore size. The collagen is precipitated at pH 4–5 and collected by centrifugation. Finally 4–10% collagen gels in aqueous medium are prepared for lens production.

(iii) Salt extraction

Collagen can be extracted from tissue by treatment with salt solutions, e.g. dilute aqueous NaCl, but the yields are poor as in the case of acid extraction, and this procedure is not recommended.

(iv) Enzyme extraction

For reasons previously enumerated enzyme extraction is the preferred method for recovering collagen by the solution process.

Cleaned, de-haired hide or skin is cut into pieces of workable size and slurried in water in the presence of a proteolytic enzyme (other than collagenase). Suitable enzymes are pepsin, trypsin, pronase, proctase, etc. The soluble extract is worked up as follows: The solution is brought to a pH of about 10.0 (when extracting for example with pepsin or proctase) to denature the remaining active enzyme, and then neutralized to a pH of about 6.7–7.0. "Atelocollagen" precipitates at this pH leaving behind in solution (to be discarded) the digested telopeptides, and other contaminating proteins, e.g. albumin, globulin, and any saccharides, mucopolysaccharides, etc. The atelocollagen is usually further purified by repeated solubilization at pH 2–3, reprecipitation at pH 6–7 and recovered by filtration. The recovered collagen is then washed with ethanol to remove any lipid content and excess water in preparation for the solvent defatting process. The collagen is defatted by treatment with 1:1 ethanol-ethyl ether mixture and recovered as a fibrous solid. It is then air-dried, and subsequently converted to gel by solubilization in acidified water at a pH of about 3.0.

(B) Fiber Collagen

Native collagen is also recovered in fiber form (not dissolved at all) by dispersion of the collagen in an aqueous medium and recovery by some means such as centrifuging, etc. Fiber collagen is usually recovered from animal tendon or hide as opposed to skin or bone source. Tendon, e.g. is de-sheathed, sliced and homogenized to separate individual tendon fibers in specialized "micro-cut" machines. Water is present during the machining of the tendon and the fibers become dispersed therein. The dispersion is repeatedly (2 or 3×) washed with dilute salt solution (5% NaCl) and the collagen fibers recovered by centrifuging. The fibers are washed with water to remove salt preparatory to enzyme treatment. The dispersion is treated with pancreatin, an enzyme which is very effective in dissolving non-collagenous material which encircles the fibers and binds them together. All undesirable components, as mentioned above, are also digested during this enzyme treatment which is carried out for about 24 hours at room temperature at pH of about 7–8 and enzyme concentration of 0.5 wt. % based on the weight of dry collagen. After recovering the collagen fibers by centrifuge, the fibers are washed with dilute aqueous salt solution and finally with water after which they are defatted. The product is recovered from the defatting solvent, dried in air, powdered and swollen at 1–3% concentrations in dilute HCl or citric acid (pH about 2–3). For conversion of the fibers to finer collagen fibrils from which lens are eventually made, the fibers are homogenized by mortar action, whereupon they become homogenous and transparent, and the product is a clear, viscous pourable dispersion.

Hide collagen is worked up in the same manner as tendon collagen to produce fibers therefrom, but in doing so it is recommended that the hair side and flesh side be cut away and only the corium layer used.

Fiber collagen possesses high tensile strength and its high degree of natural crosslinking makes it easier to purify without degradation, particularly during enzyme treatment wherein a milder acting enzyme is used and in any finishing crosslinking operation.

FAT REMOVAL

Practically all sources of animal collagen, whether young calf or older animals, contain more or less quantities of fats and lipid materials which must be removed before a transparent collagen gel suitable for lens production can be obtained. Most fatty materials are preferably physically removed from the animal source, e.g. hide, tendon, etc. by cutting or scraping before the solubilization or extraction process is initiated. This procedure cuts down on the extent of the fat solvent extraction step required in the subsequent processing. Fats and lipid materials must be removed to the extent that they interfere with transparency of the collagen gel. In general, any steps taken to minimize the costly and sometimes hazardous solvent extraction process is encouraged; however, applicant, in characterizing his collagen gels as fat-poor means to include all collagen gels whether prepared from fat-poor raw collagen materials, or whether resulting from fat and lipid physical or chemical extraction processes, however mild or severe, and conducted at any stage prior to the gel shaping and crosslinking.

Collagen (solubilized or fiber) contains many $NH_2$ and COOH groups in its structure and chemical modifications of the molecule can be readily made, e.g. all or some of the amino groups may be acylated by reaction with a mixture of acetic anhydride and acetic acid, or other anhydride such as succinic anhydride. All or some of the carboxyl groups contained in the molecule may be esterified by the standard reaction with acidified alcohol, preferably a water-soluble, aliphatic alcohol, such as methanol, ethanol, etc. In the above reactions the isoelectric point of collagen can be controlled, either negative or positive, or completely neutralized. Excellent soft contact lenses have been made from collagens which have been succinylated and methylated prior to crosslinking.

Gels having collagen concentrations ranging from 1% to 30 wt. % can be utilized for collagen lens production, but the preferable concentration is 1% to 20% with the balance after addition of the polyhydroxy polymer, being water. In general, gels made from fiber collagen exhibit greater physical strength characteristics than gels made from solubilized collagens of the same collagen concentrations. Therefore, fiber collagen gel lenses can be made with lower collagen concentrations and higher water contents without risking loss of desired properties. As the collagen content of the gel increases substantially above about 15-20%, the material becomes gummy and difficult to handle and work. A collagen soft contact lens of higher water content is more pliable, superior in oxygen diffusion, and more comfortable to wear. However, in general the mechanical strength of the lens is improved with decreasing water content.

CROSSLINKING

Crosslinking of the lens-shaped collagen gel containing the additive of this invention may be carried out by irradiation with gamma or ultraviolet rays or by chemical means, or by a combination of both. Applicant has found that the chemical method is susceptible to closer control of crosslinking conditions, and contrary to former belief, is preferred to irradiation.

When irradiation is used, (gamma rays or ultraviolet light), the treatment should be carried out in a nitrogen atmosphere (as opposed to air) and the dosage should be carefully controlled in order to prevent undue damage to the tropocollagen triple helix molecule structure. The dosage depends upon the collagen concentration in the gel. Irradiation of 500-900 K rads at a dose rate of 80-85 K rads per hour is adequate to stabilize a 5% collagen gel; while proportionately higher doses or longer exposure is required for higher concentration gels, e.g. 1200-1600 K rads at a similar dosage rate and in the presence of nitrogen for a 10% gel.

Chemical crosslinking is carried out by treatment of the collagen gel with such agents as formaldehyde, glutaraldehyde, acrolein, glyoxal, dialdehyde-starch, bifunctional reagents such as maleimide derivatives, chromic acid, alkyl and aryl halides, isocyanates, etc. Applicant prefers the use of glutaraldehyde or acrolein due to their controllable reaction under proper conditions, and their ability to be more easily removed, e.g., by leaching from the crosslinked gel.

Crosslinking is carried out on the lens-shaped gel and preferably in the lens mold simultaneously with the molding of the lens. Typically, aqueous collagen gel containing 8.0 wt. % collagen and 0.8% mucopolysaccharide (chondroitin sulfate, Cal Bio-chem) is mixed with 10% acrolein solution at a ratio of 0.067/1 acrolein to collagen. The mixture was de-aerated by centrifuge at 4000 rpm for 1-20 minutes and placed in a lens mold. The crosslinking reaction was carried out at a pH of 6.2 (0.1 M citrate) for a period of preferably 6-7 hours at a low temperature (20°). Excess crosslinking agent was removed by washing with 0.1 M citrate solution at pH of 6.2 with a phosphate buffer at pH 7.0 and finally with saline solution.

Irradiation is carried out in a Gammator M type gamma irradiator obtained from Radiation Machinery Corporation, Parsippany, New Jersey. The glass vessel containing the lens mold during irradiation was a standard, relatively wide-mouth, two-hole rubber-stopped vessel permitting removal of air and replacement with nitrogen.

The lens molds used in the shaping of the collagen gel were manufactured from brass, glass and plastic. The mold consists of a lower concave part and an upper convex part. The surface of the convex part, when the mold is closed, reaches the surface of the concave section, except for the desired thickness of the collagen lens. The desired thickness is approximately 0.4 millimeters, preferably about 0.3 millimeters.

The invention is illustrated by the following examples:

EXAMPLE 1

Enzyme solubilized collagen was prepared as follows:

Fresh calfskin (about 5 kg) was dehaired, cleaned by shaving and cut into small pieces. The skin was solubilized in 10 liters of water (pH 2.5, HCl) by addition of 1 g of pepsin (approximate ratio of enzyme to collagen is 1/400) and kept at 20° C. for five days with intermittent stirring. The resulting viscous solubilized collagen was filtered through cheesecloth, its pH adjusted to 10 with NaOH and allowed to stand for 24 hours at 4° C. to inactivate the pepsin. The pH of collagen was then adjusted to 7 to 8 (HCl) and collagen precipitate was collected by centrifuging. Fatty constituents were then removed from the collagen. To one part of collected collagen was added two parts of fat solvent, e.g. ethanol ether mixture (1:1), and the mixture was homogenized in a Waring blender. Collagen was separated from solvent by squeezing in cheesecloth and homogenized again with the same volume of solvent.

After being squeezed it was air-dired to remove solvent and redissolved in 0.1 M citric acid solution containing 1 M glucose to make gel of 8% collagen. The pH of the gel was adjusted to 6.3 with NaOH solution.

On the other hand, chondroitin sulfate C (sodium salt from shark cartilege, Calibiochem) was dissolved in 0.1 M citric acid solution containing 1 M glucose (pH 6.3, pH is adjusted with NaOh) to make chondroitin sulfate concentration to 8%. Chmixture and homogenized well again.

The mixture of collagen-chondroitin sulfate (collagen concentration 6% chrondroitin sulfate concentration 0.6%, pH 6.3, citrate concentration 0.1 M,) was cooled in an ice bath. To 10 g of ice-cooled collagen chondroitin mixture was added 0.36 ml of ice-cooled 0.5% glutaraldehyde in pH 6.3 of 0.1 M glucose solution and homogenized well in an ice bath. The mixture was centrifuged in a plastic syringe at 4° C. at 4000 rpm for 1 hour to remove air bubbles.

On a lower concave part of a lower lens mold (glass) was placed 0.2 g of centrifuged collagen gel and the upper convex part of the lens mold was pushed onto the lower mold containing collagen gel. The entire mold was allowed to stand at 25° C. for 16 hous to crosslink the gel. Collagen lens was removed from the mold and treated with 0.05% glutaraldehyde in pH 7.0 phosphate buffer for 5 minutes to introduce enough crosslinkages into collagen lens. The lens was washed in pH 7.0 phosphate buffer repeatedly to leach out excess glutaraldehyde. The finished lens was kept in a normal saline. This lens is optionally clear, flexible and stable, its water content was 94%, and it displays excellent properties as a biostable soft contact lens.

EXAMPLE 2

According to the method of Example 1, 8% collagen gel (pH 6.4, in 0.1 M citrate and 1 M glucose) was prepared.

Polyvinylalcohol (99 100% hydrolized, J. T. Baker) was dissolved in 0.1 M citric acid and 1 M glucose solution (pH 6.3) at a concentration of 8%.

The mixture of collagen—PVA was prepared and the lens was produced by using the exactly same procedure as that of Example 1 except glutaraldehyde crosslinking. Acrolein was used for cross-linking instead of glutaraldehyde.

To 10 g of ice-cooled PVA mixture was added 0.36 ml of ice-cooled 5% acrolein in 0.1 M citrate 1.0 M glucose solution (pH 6.3). The mixture was centrifuged and lens was shaped. For the second aldehyde treatment, the shaped lens was immersed in 0.1% acrolein in pH 7.0 phosphate buffer for 10 minutes to introduce enough crosslinkages.

The lens is optically clear, flexible and stable and displays excellent properties as a bio-stable soft contact lens.

Water soluble polymers such as polyhydroxyethylmethacrylate, carboxymethylcellulose, polyvinylpyrolidone, etc., can be mixed by using the same method. The collagen lens mixed with these water soluble polymers is bio-stable more than collagen alone lens.

Also solubilized collagens other than enzyme solubilized collagen described in Example 1, such as base extracted collagen, acid extracted collagen are able to be used for lens production using the methods of Example 1 and 2. Fibril collagen is also available for the lenses consisting of collagen-mucopolysaccharides and collagen water-soluble polymers.

EXAMPLE 3

Collagen gel of 8% (pH 6.4 in 0.1 M citrate and 1 M glucose) was prepared according to the procedure of Example 1. Poly (2-hydroxyethylmethacrylate), (poly HEMA, Aldrich) of 8% solution was prepared in pH 6.3 0.1 M citrate—1 M glucose). To 100 g collagen gel was mixed 10 ml of poly HEMA solution and the mixture was well homogenized. The mixture was placed in a vacuum dessicator and nitrogen was introduced into a dessicator to substitute for the air dissolving in the mixture with nitrogen. Nitrogen saturated mixture was placed on the lower concave part of the lens mold and the upper convex part of the lens mold was pushed onto the lower mold containing the mixture. The entire mold was subjected to gamma ray irradiation for 5 hours at a dose of 0.1 M rads to effect partial crosslinking. The gamma irradiation introduces crosslinkages between collagen and collagen and collagen and poly HEMA. However, in order to introduce additional collagen to collagen crosslinkages the lens removed from the mold was treated in an acrolein solution of 0.1% in pH 7.0 phosphate buffer for 10 minutes. The cross-linked lens was washed in pH 7.0 phosphate buffer repeatedly to leach out excess aldehyde. The finished lens was kept in a normal saline. This lens is optically clear, flexible and stable, and displays excellent properties as a biostable soft contact lens.

The combination crosslinking by gamma-irradiation and chemical treatment can be applied also to the mixture gel of collagen and water soluble polymers other than poly HEMA.

Lenses prepared according to this invention were optically clear, flexible and stable and display excellent properties as a soft contact lens. They showed little deterioration when exposed for long periods of time to high concentrations of bacteria that produce enzymes.

Collagen gel lenses are kept in sterile water or saline solution and display excellent storage properties. They have approximately the same refractive index as water itself. Should a lens become dehydrated, partly or completely, due to exposure to dry air it is restored unimpaired to its original conditions by simple immersion in water, thus displaying its "perfect memory" characteristic. A lens purposely allowed to become dry and shriveled returned to normal in less than twenty minutes after water immersion.

All of the collagen lenses of this invention can be modified by known optical techniques to prescription values. Thus, soft contact collagen lenses can be prepared for use by patients requiring known normal sight corrective measures, e.g., incorporation of spherical power.

Soft contact lens made from collagen gels containing organic water-soluble polyhydroxy polymers possess all the characteristics and display all the advantages previously described by the applicant in previous applications on collagen soft contact lenses, both as to physical and optical properties and comfort to wearer.

Having described the invention in sufficient detail that it may be practiced by those skilled in the art

What is claimed is:

1. As an article of manufacture, a soft contact lens consisting of a body of lens-shaped subsequently cross-linked collagen gel, said gel having a concentration of 1.0 to 30 wt. % collagen, 0.1 to 30 wt. % of a water-soluble, organic polymer, and the balance water.

2. The soft contact lens of claim 1 in which the gel is enzyme-solubilized collagen.

3. The soft contact lens of claim 1 in which the lens-shaped gel is chemically cross-linked.

4. The soft contact lens of claim 1 in which the lens-shaped gel is cross-linked in two stages utilizing irradiation in one stage and chemical treatment in the other.

5. The soft contact lens of claim 1 in which the gel contains 1.0 to 25 wt. % of mucopolysaccharide.

6. The soft contact lens of claim 5 in which the lens-shaped gel is crosslinked with glutaraldehyde.

7. The soft contact lens of claim 1 in which the gel contains 1.0 to 25 wt. % polyvinyl alcohol.

8. The soft contact lens of claim 7 in which the lens-shaped gel is cross-linked by treating with acrolein in two stages.

* * * * *